US012358121B2

(12) United States Patent
St-Laurent

(10) Patent No.: US 12,358,121 B2
(45) Date of Patent: *Jul. 15, 2025

(54) MODULAR TOOL BAG POUCH DEVICE AND TOOL BAG SYSTEM

(71) Applicant: Michael St-Laurent, Metis-sur-Mer (CA)

(72) Inventor: Michael St-Laurent, Metis-sur-Mer (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,573

(22) Filed: Apr. 17, 2024

(65) Prior Publication Data

US 2024/0261957 A1 Aug. 8, 2024

Related U.S. Application Data

(63) Continuation of application No. 17/741,034, filed on May 10, 2022, now Pat. No. 11,986,943.

(60) Provisional application No. 63/187,173, filed on May 11, 2021.

(51) Int. Cl.

*B25H 3/00* (2006.01)
*A45F 3/00* (2006.01)
*A45F 3/14* (2006.01)
*A45F 5/02* (2006.01)
*A45F 5/00* (2006.01)

(52) U.S. Cl.

CPC ................. *B25H 3/00* (2013.01); *A45F 3/14* (2013.01); *A45F 5/021* (2013.01); *A45F 2003/003* (2013.01); *A45F 2003/144* (2013.01); *A45F 5/1575* (2025.01)

(58) Field of Classification Search

CPC .......................... A45F 5/021; A45F 2200/0575
USPC .... 224/666, 669, 904, 667, 901.8, 911, 914, 224/668; 206/373
See application file for complete search history.

(56) References Cited

U.S. PATENT DOCUMENTS 3,854,639 A * 12/1974 Genchi .................. B26B 29/00 224/236
4,140,253 A * 2/1979 Vickers ................ F41C 33/003 24/444
4,403,366 A * 9/1983 Lucke .................... A47K 10/04 24/442
4,408,706 A * 10/1983 Hurley ...................... B65C 9/00 224/904
4,819,846 A * 4/1989 Hannemann .............. A45F 5/00 224/241

(Continued)

*Primary Examiner* — Justin M Larson

(74) *Attorney, Agent, or Firm* — Brennan, Manna & Diamond, LLC

(57) ABSTRACT

The present invention relates to the field of tool belts. More specifically, the present invention relates to a modular tool bag pouch device and tool bag system that is comprised of at least one tool pouch further comprised of at least one clip and at least one fastener on the rear surface of the pouch. In a differing embodiment, the invention is comprised of a system, wherein the system is comprised of a tool bag, a belt further comprised of at least one fastener, and at least one tool pouch. The tool pouch is generally rectangular and made of a material that is wear- and water-resistant. The device may also easily attach to a tool bag and a belt such that tools may be carried on the waist of an individual. In this manner, the device can be applied to any job such that the tools are within reach.

3 Claims, 3 Drawing Sheets

(56) References Cited

U.S. PATENT DOCUMENTS 4,848,624 A * 7/1989 Clem ........................ A45C 7/00 224/267
D302,489 S * 8/1989 Stone ........................ D3/228
4,923,105 A * 5/1990 Snyder ........................ A45F 5/02 224/255
4,953,765 A * 9/1990 Little ........................ A45F 5/00 383/902
5,240,156 A * 8/1993 Sicotte ........................ A45F 5/02 224/583
5,341,975 A * 8/1994 Marinescu ........................ A45F 5/02 224/684
5,413,262 A * 5/1995 Dewire ........................ A41F 9/002 224/675
5,501,379 A * 3/1996 Munoz ........................ B25H 3/00 224/684
5,505,356 A * 4/1996 Noriega ........................ A41D 13/0012 2/338
5,570,824 A * 11/1996 Lyon ........................ A45F 5/021 224/678
5,743,447 A * 4/1998 McDermott ........................ A45C 7/0086 224/583
5,833,095 A * 11/1998 Russell ........................ A45F 5/02 224/684
5,894,976 A * 4/1999 Harper ........................ A45F 5/00 224/660
D410,773 S * 6/1999 Case ........................ D3/228
5,988,315 A * 11/1999 Crane ........................ A62B 35/0018 182/3
6,179,185 B1 * 1/2001 Dancyger ........................ A45F 5/02 224/904
6,216,931 B1 * 4/2001 Trawinski ........................ A45F 3/14 224/904
6,571,997 B2 * 6/2003 Dedrick ........................ A45F 5/00 224/183
D482,863 S * 12/2003 Flood ........................ D3/224
6,691,906 B2 * 2/2004 Cragg ........................ F41C 33/046 224/236
6,698,632 B1 * 3/2004 Turner, Jr. ........................ A45F 5/022 224/904
6,726,075 B1 * 4/2004 Patel ........................ A45F 3/14 224/582
6,729,518 B2 * 5/2004 Badillo ........................ G06F 1/163 224/904
D500,409 S * 1/2005 Rivera ........................ D3/228
7,011,241 B2 * 3/2006 Godshaw ........................ A45F 4/00 224/904
7,165,706 B2 * 1/2007 Barr ........................ A45F 5/021 224/672
7,597,225 B2 * 10/2009 Badillo ........................ G03B 17/566 224/675
7,699,197 B2 * 4/2010 Panosian ........................ A45F 5/02 224/665
7,757,911 B2 * 7/2010 Barker ........................ A45F 4/02 224/625
8,152,037 B2 * 4/2012 Sabbag ........................ B25H 3/00 224/236
8,256,652 B2 * 9/2012 Murdoch ........................ F41C 33/04 224/675
8,474,673 B2 * 7/2013 Murdoch ........................ A45F 5/021 224/675
8,561,954 B2 * 10/2013 Padilla ........................ E06C 7/14 248/238
8,991,672 B2 * 3/2015 Hassler ........................ B25H 3/00 224/663
D771,939 S * 11/2016 Kinskey ........................ D3/228
10,350,746 B2 * 7/2019 Martinez ........................ A45F 3/04
11,698,241 B1 * 7/2023 de Nijs ........................ F42B 39/26 224/237
12,121,136 B2 * 10/2024 Wachter ........................ B25H 3/02
2003/0197042 A1 * 10/2003 Warren ........................ A45C 1/04 224/183
2004/0016784 A1 * 1/2004 Berry ........................ B25H 3/00 224/661
2005/0242144 A1 * 11/2005 Panosian ........................ A45F 5/02 224/684
2006/0102678 A1 * 5/2006 Bommarito ........................ A45F 5/021 224/904
2008/0017683 A1 * 1/2008 Votel ........................ B25H 3/00 224/904
2012/0012624 A1 * 1/2012 Marrero ........................ A63B 57/203 224/660
2013/0112722 A1 * 5/2013 Detry ........................ F41C 33/0254 224/243
2013/0221045 A1 * 8/2013 McStay ........................ A45F 5/021 224/183
2015/0021372 A1 * 1/2015 Moreau ........................ A45F 5/021 224/677
2015/0237992 A1 * 8/2015 Kinskey ........................ A45F 3/005 224/681
2022/0143806 A1 * 5/2022 Herrera ........................ A45C 13/02
2022/0362924 A1 * 11/2022 St-Laurent ........................ B25H 3/00

* cited by examiner

MODULAR TOOL BAG POUCH DEVICE AND TOOL BAG SYSTEM

CROSS-REFERENCE TO RELATED APPLICATION

The present application is a continuation application of, and claims priority to and the benefit of, U.S. patent application Ser. No. 17/741,034, which was filed on May 10, 2022 and claims priority to U.S. Provisional Application No. 63/187,173, which was filed on May 11, 2021, both of which are incorporated herein by reference in their entirety.

FIELD OF THE INVENTION

The present invention relates generally to the field of tool belts. More specifically, the present invention relates to a modular tool bag pouch device and tool bag system that is comprised of at least one tool pouch further comprised of at least one clip and at least one fastener on the rear surface of the pouch. In a differing embodiment, the invention is comprised of a system, wherein the system is comprised of a tool bag, a belt further comprised of at least one fastener, and at least one tool pouch. The tool pouch is generally rectangular and made of a material that is wear-and water-resistant. The device may also easily attach to a tool bag and a belt such that tools may be carried within an accessible range of an individual. In this manner, the device can be applied to any job such that the necessary tools are accounted for and within reach. Accordingly, the present disclosure makes specific reference thereto. Nonetheless, it is to be appreciated that aspects of the present invention are also equally applicable to other like applications, devices and methods of manufacture.

BACKGROUND

Tools can be used for a multitude of different tasks, purposes, and jobs. However, tools can sometimes be difficult to organize or carry around. When doing work in the yard or on a job site, tools often need to be transferred from a potentially organized toolbox to the area in which work is being performed. During that transportation, the tools may become unorganized, or there may not be a convenient place to set the tools when they are not in use. Tool belts and pouches are convenient, but can only hold so many tools and the tools must be reorganized once placed in the tool belt or pouch.

Therefore, there exists a long-felt need in the art for a modular tool bag pouch device and tool bag system. There also exists a long-felt need in the art for a modular tool bag pouch device that can easily attach to and detach from a tool bag to keep tools organized when transporting the tools to a work area. Further, there exists a long-felt need in the art for a modular tool bag pouch device that can clip onto the belt or pants of an individual. In addition, there exists a long-felt need in the art for a modular tool bag pouch device that can be easily accessed in a work area to increase the efficiency of the overall project.

The subject matter disclosed and claimed herein, in one embodiment thereof, comprises a modular tool bag pouch device and tool bag system. The device is comprised of at least one tool pouch further comprised of at least one clip and at least one fastener on the rear surface of the pouch. In a differing embodiment, the invention is comprised of a system wherein the system is comprised of a tool bag, a belt further comprised of at least one fastener, and at least one tool pouch. The tool pouch is generally rectangular and may be of any material such that it is resistant to wear from the placement and removal of tools as well as water-resistant to protect the tools stored inside. The device may easily detach from a tool bag and clip onto the belt of an individual to be carried within an accessible range in a work area. In this manner, the device can be applied to any job such that the necessary tools are accounted for and within reach, yet out of the way of the work to be performed.

In this manner, the modular tool bag pouch device and tool bag system of the present invention accomplishes all the foregoing objectives and provides a means to keep tools organized when moving said tools out of a tool bag and into a work area. Further, the device can attach to and detach from a tool bag, removing the need for the tools to be reorganized or additionally accounted for during a job. In addition, the device can attach to the belt or pants of an individual, providing a convenient spot for the tools to be placed when not in use but also easily accessible when a tool is needed.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a modular tool bag pouch device and tool bag system. The device is comprised of at least one tool pouch further comprised of at least one clip and at least one fastener on the rear surface of the pouch. In a differing embodiment, the invention is comprised of a system wherein the system is comprised of a tool bag, a belt further comprised of at least one fastener, and at least one tool pouch. In differing embodiments, the tool pouch may be of any shape and dimension. However, in the preferred embodiment the tool pouch is generally rectangular and capable of holding multiple handheld tools. The tool pouch and system may also be made of a plurality of materials commonly used for making tool carrying devices. However, the system is preferably made of a leather, nylon, canvas, or polyester material.

The tool pouch is comprised of a body which is further comprised of a reinforced top edge to prevent deformation, a front surface, and a rear surface. The front surface is further comprised of a pocket in which tools may be placed. In one potential embodiment, the front surface may be further comprised of a flap to cover the tools in the pocket and an at least one fastener. The flap may also attach to the fastener on the front surface of the tool pouch to better secure and protect the tools in the tool pouch.

The rear surface of the body of the tool pouch may be further comprised of an at least one fastener and an at least one clip. Both the fastener and the clip allow the tool pouch to easily attach to and detach from a side wall of a tool bag and a belt. In the preferred embodiment of the device, the fastener of the rear surface of the tool pouch may be a hook fastener capable of attaching to the loop fastener of the side wall of the tool bag and of an outer surface of the belt. The clip may be used to clip the tool pouch onto the tool bag and the belt whereas, the fastener may provide additional support and stabilization for the attachment to both the tool bag and the belt. Both the clip and the fastener of the rear surface of the tool pouch may be used independently to attach to the tool bag and the belt or in addition to one another.

Accordingly, the modular tool bag pouch device and tool bag system of the present invention is particularly advantageous as it allows an individual to move tools from a tool bag to a work area by attaching to a tool belt without removing the tools from their place of storage. Further, the device can attach to the belt or pants of an individual, providing accessibility to needed tools and a convenient spot to place tools when not in use or no longer needed. In addition, the device can attach to and detach from a tool bag, keeping the tools organized when transporting to and from a work area. In this manner, the modular tool bag pouch device and tool bag system overcomes the limitations of existing tool belts known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
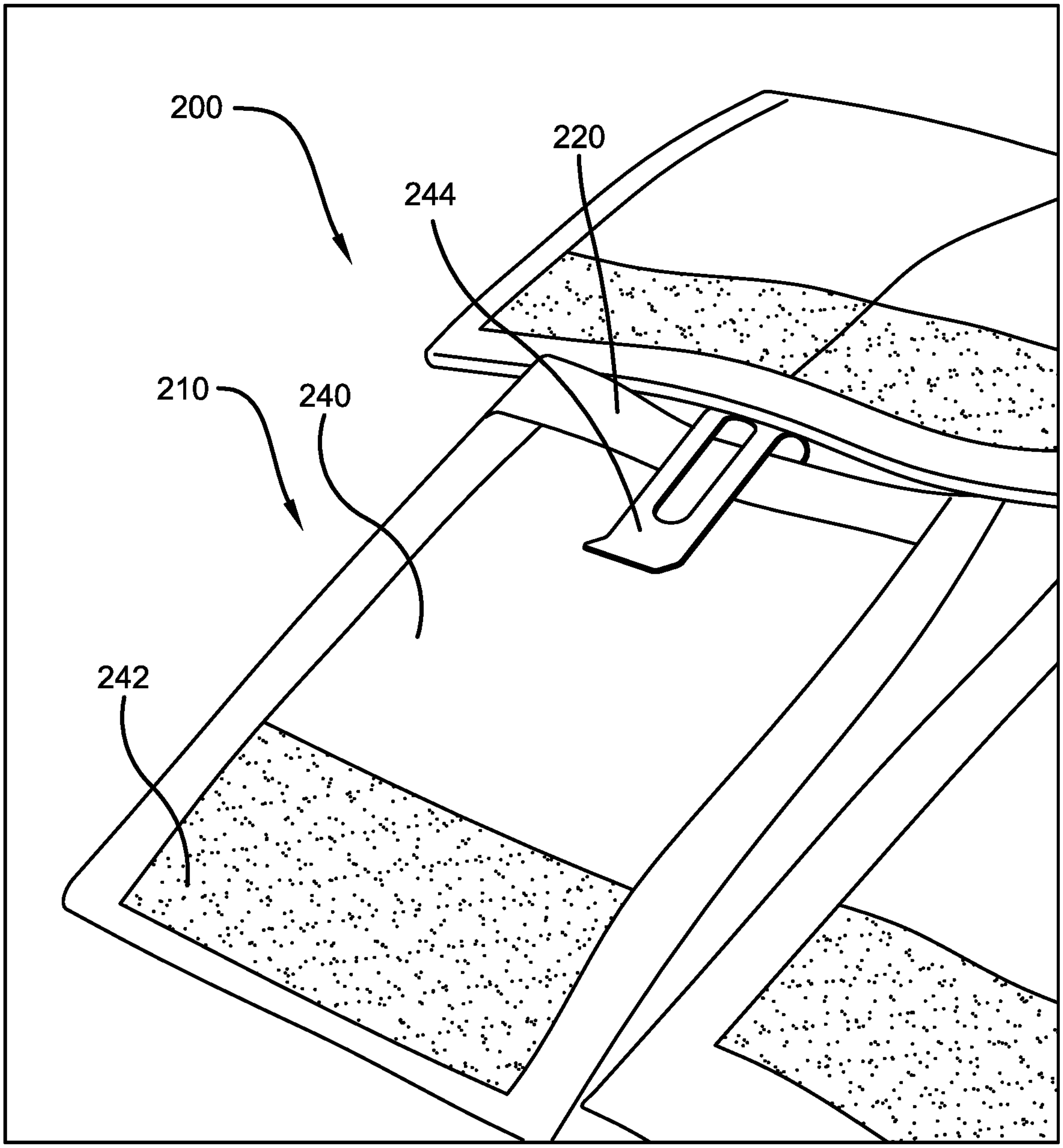
FIG. 1 illustrates a perspective view of a rear surface of one potential embodiment of a modular tool bag pouch device and tool bag system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a modular tool bag pouch device and tool bag system. There also exists a long-felt need in the art for a modular tool bag pouch device that can easily attach to and detach from a tool bag to keep tools organized when transporting the tools to a work area. Further, there exists a long-felt need in the art for a modular tool bag pouch device that can clip onto the belt or pants of an individual. In addition, there exists a long-felt need in the art for a modular tool bag pouch device that can be easily accessed in a work area to increase the efficiency of the overall project.

The present invention, in one exemplary embodiment, is comprised of a modular tool bag pouch device and tool bag system in which the tool bag pouch device can clip onto the tool bag and belt of an individual, keeping the tools organized and easily accessible. The device is comprised of at least one tool pouch further comprised of at least one clip and at least one fastener on the rear surface of the pouch. In a differing embodiment, the invention is comprised of a system, wherein the system is comprised of a tool bag, a belt further comprised of at least one fastener, and at least one tool pouch. In differing embodiments, the tool pouch may have a generally rectangular shape capable of holding multiple handheld tools. The tool pouch may also be made of a plurality of materials that may be commonly used for making tool bags, but is preferably made of nylon, canvas, or polyester.

Further, the tool pouch is comprised of a body, which is further comprised of a top edge, a front surface, and a rear surface. The top edge of the body may be reinforced with a metal or other similar material, possibly in the form of a wire of any thickness for differing sizes of pouches, to prevent the top edge from deforming over time. The front surface of the body is further comprised of a pocket in which tools may be placed for storage, easy access, or transportation. In one potential embodiment, the front surface of the body of the tool pouch may be further comprised of a flap and a fastener. The flap may cover the tools in the pocket and extend down to attach to the front surface of the body via an at least one fastener. In this embodiment, the flap may better secure the tools in the pocket or protect them from water, dirt, weather, or anything that may damage the tools.

The rear surface of the body may further be comprised of an at least one fastener and an at least one clip. In the preferred embodiment, the fastener is a hooked surface that can be attached to a side wall of a tool bag that is comprised of a looped surface. The clip may be any clip known in the art and may be fixedly or removably attached to the rear surface of the body of the tool pouch. In the preferred embodiment, the clip is stamped metal and riveted to the rear surface of the pocket. However, in differing embodiments, the clip may be of any material and attached to the body via any method or fastener. The clip may be used to attach to the tool bag, either independently from the fastener of the rear surface or in addition to the fastener of the rear surface. In addition, the clip may attach the tool pouch to a belt worn around the waist of an individual. The clip may slide over the top of the belt, compressing the belt to the tool pouch. The belt may be further comprised of an outer surface in which an at least one fastener may engage the fastener of the rear surface of the body. In the preferred embodiment, the fastener of the belt may be a loop fastener such that it can attach to the hook fastener of the rear surface of the body, providing additional support and stabilization for the system.

Accordingly, the modular tool bag pouch device and tool bag system of the present invention is particularly advantageous as it allows an individual to move tools from a tool bag to a work area by attaching to a tool belt without removing the tools from their place of storage. Further, the device can attach to and detach from a tool bag, keeping the tools organized in a work area. In addition, the device can attach to and detach from the belt or pants of an individual, providing a convenient spot to place tools when not in use as well as keeping tools that may be needed within an easily accessible range. Therefore, the device eliminates the need for tools to be reorganized when transporting them from a tool bag or other storage system to a work area.

Referring initially to the drawings, FIG. 1 illustrates a perspective view of a rear surface 240 of one potential embodiment of a modular tool bag pouch device and tool bag system 100 of the present invention in accordance with the disclosed architecture. The device 100 is comprised of at least one tool pouch 200 further comprised of at least one clip 244 and at least one fastener 242 on the rear surface 240 of the pouch 200. In a differing embodiment, the invention is comprised of a system 500, wherein the system is comprised of a tool bag 300, a belt 400 further comprised of at least one fastener 404, and at least one tool pouch 200. In differing embodiments, the tool pouch 200 may have the general appearance of any shape such as, but not limited to, a rectangle, a square, a triangle, a circle, an oval, a pentagon, etc., and be of any length, width, height, or other dimension such that handheld tools 10 may be secured in the tool pouch 200. Further, the pouch 200 is preferably made of a durable and generally water-resistant material such as, but not limited to, nylon, canvas, leather, polyester, etc.

The tool pouch 200 is further comprised of a body 210, which may be further comprised of a top edge 220, a front surface 230, and a rear surface 240. The top edge 220 of the body 210 may be of a differing material from the pouch 200 or be reinforced with a metal or other stiffer material to prevent deformation in the top edge 220 of the body 210. The reinforced material of the top edge 220 may be in the form of a wire or thin plate as to be easily concealed and may be of any length, width, or other dimension to accommodate for differing sized tool pouches 200. The front surface 230 of the body 210 may be comprised of at least one pocket 232 in which tools 10 may be organized for ease of access, storage, or transportation. In one potential embodiment, the front surface 230 of the body 210 is further comprised of at least one flap 234 and at least one fastener 236. The flap 234 may extend over any tools 10 in the pocket 232 and attach to the fastener 236 on the front surface 230 of the body 210, further securing and protecting the tools 10 within the pouch 200. The fastener 236 may be any fastener known in the art such as, but not limited to, a hinge, a screw, a bolt, a magnet, a hook-and-loop fastener, snap button, magnetic, adhesive, zipper, etc.

Figure 2:
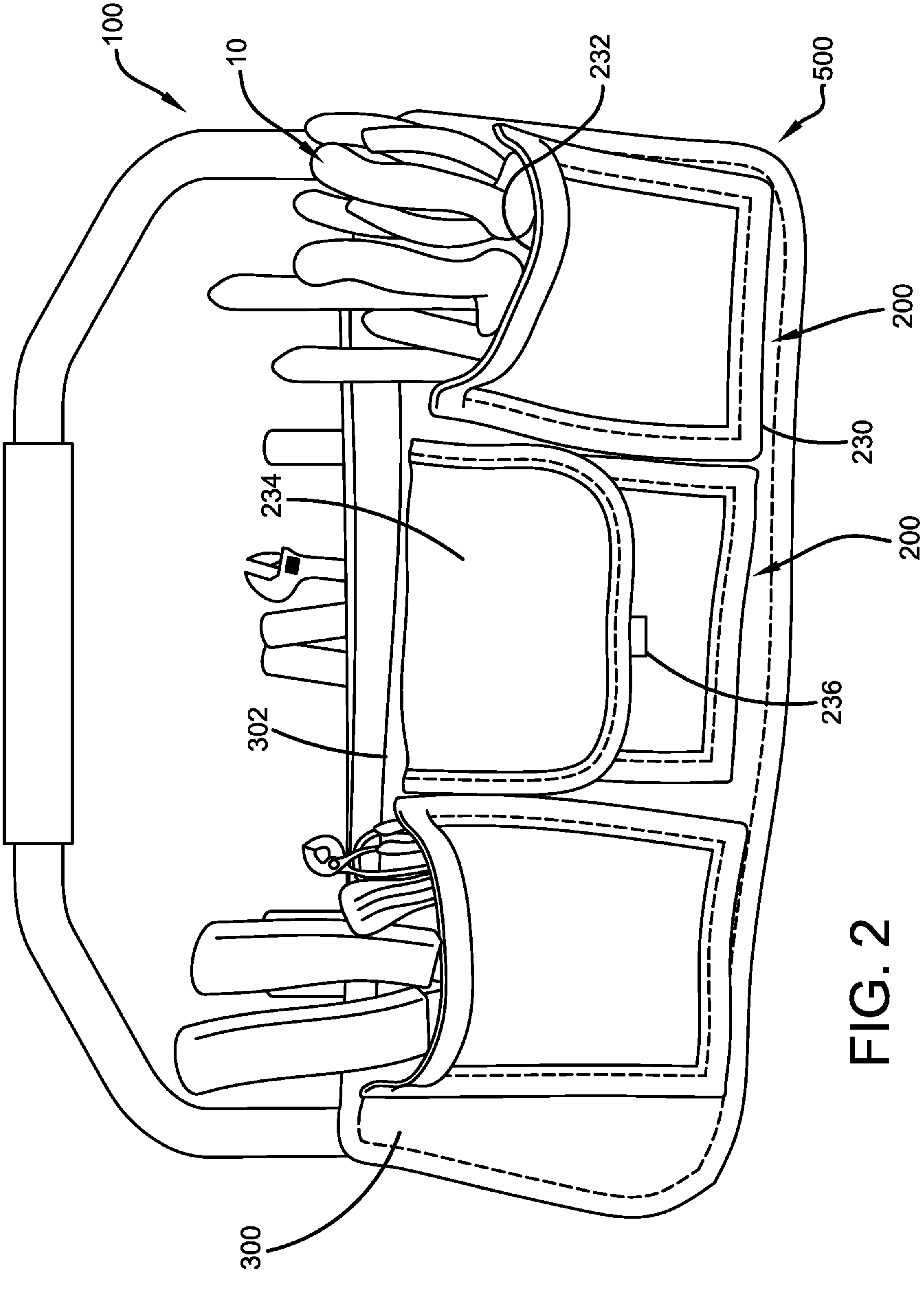
FIG. 2 illustrates a perspective view of one potential embodiment of a modular tool bag pouch device and tool bag system of the present invention wherein a tool pouch is attached to a tool bag in accordance with the disclosed architecture.

FIG. 2 illustrates a perspective view of one potential embodiment of a modular tool bag pouch device and tool bag system 100 of the present invention wherein a tool pouch 200 is attached to a tool bag 300 in accordance with the disclosed architecture. The rear surface 240 of the body 210 of the tool pouch 200 may be comprised of at least one fastener 242 and at least one clip 244. The fastener 242 may attach to a side wall 302 of a tool bag 300 and be any fastener known in the art such as, but not limited to, hook and loop, adhesive, magnetic, snap button, zipper, etc. The clip 244 may be fixedly or removably attached to the rear surface 240 of the body 210. In the preferred embodiment of the device 100, the clip 244 is stamped metal for durability and riveted to the rear surface 240. The clip 244 may also aid in attaching the tool pouch 200 to the tool bag 300 or belt 400.

Figure 3:
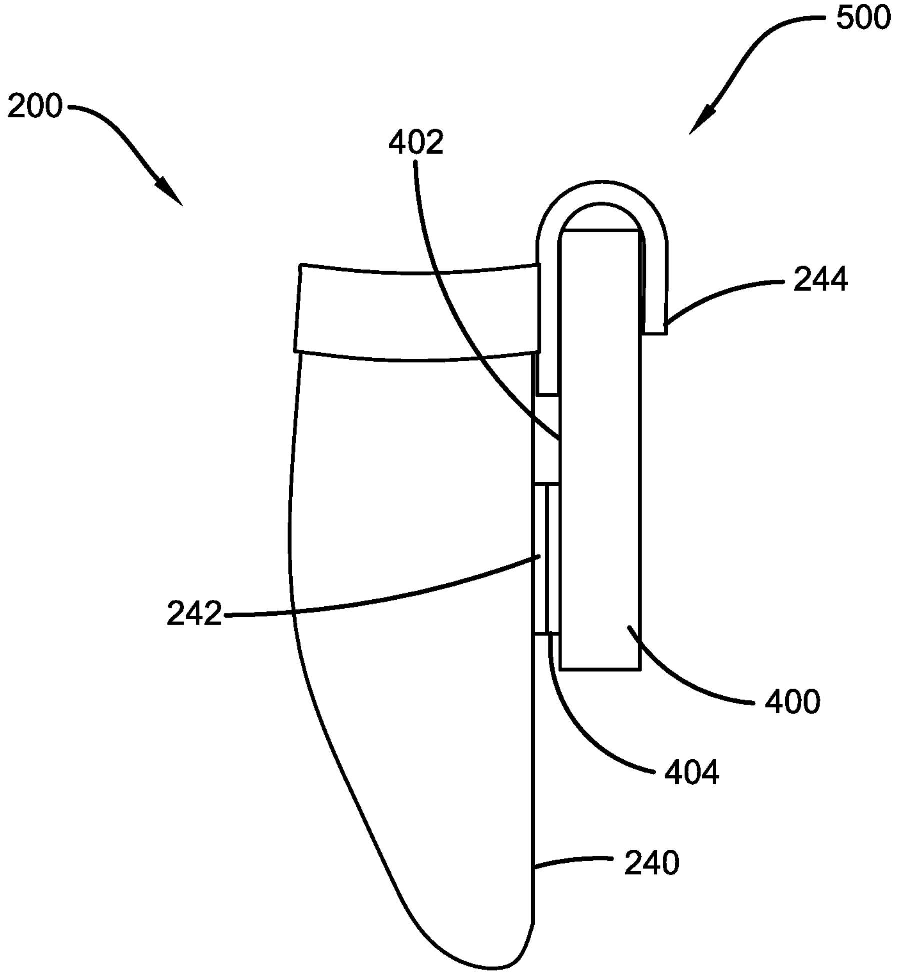
FIG. 3 illustrates a side view of one potential embodiment of a modular tool bag pouch device and tool bag system of the present invention wherein a tool pouch is attached to a tool belt in accordance with the disclosed architecture.

FIG. 3 illustrates a side view of one potential embodiment of a modular tool bag pouch device and tool bag system 100 of the present invention wherein a tool pouch 200 is attached to a tool belt 400 in accordance with the disclosed architecture. The clip 244 of the rear surface 240 of the tool pouch 200 may also be used to attach the tool pouch 200 to a worn belt 400 of an individual. The clip 244 may slide over the belt 400, generating a compressive force to retain the tool pouch 200 onto the belt 400. The belt 400 may be further comprised of an outer surface 402 which may be further comprised of a fastener 404. The fastener 404 of the belt 400 may engage the fastener 242 of the rear surface 240 of the tool pouch 200 for better retention of the tool pouch 200. In the preferred embodiment of the device 100, the fastener 242 of the rear surface 240 of the tool pouch 200 may be a hook fastener whereas the side wall 302 of the tool bag 300 and the fastener 404 of the belt 400 are comprised of a loop fastener 404 or loop surface. In this embodiment, the tool pouch 200 may attach to and detach from both the tool bag 300 and the belt 400 at the discretion of the individual using the tools 10. In differing embodiments, these fasteners 242, 302, 404 may be any fasteners known in the art. However, the fastener 404 of the belt 400 and of the side wall 302 of the tool bag 300 should be of the same fastener type as the fastener 242 of the pouch 200 to allow the fastener 242 of the rear surface 240 of the tool pouch 200 to easily attach to both the tool bag 300 and the belt 400.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "modular tool bag pouch device and tool bag system", "modular tool bag pouch device", and "device" are interchangeable and refer to the modular tool bag pouch device and tool bag system 100 of the present invention.

Notwithstanding the foregoing, the modular tool bag pouch device and tool bag system 100 of the present invention and its various components can be of any suitable size and configuration as is known in the art without affecting the overall concept of the invention, provided that they accomplish the above-stated objectives. One of ordinary skill in the art will appreciate that the size, configuration and material of the modular tool bag pouch device and tool bag system 100 as shown in the FIGS. are for illustrative purposes only, and that many other sizes and shapes of the modular tool bag pouch device and tool bag system 100 are well within the scope of the present disclosure. Although the dimensions of the modular tool bag pouch device and tool bag system 100 are important design parameters for user convenience, the modular tool bag pouch device and tool bag system 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A modular tool bag pouch device comprising:

a pouch comprising front and rear surfaces of a first material and a reinforced top edge of a second material;

a tool bag having a side wall;

a fastener; and a clip removably attached to the rear surface of the pouch;

wherein the fastener adhesively attaches to the pouch to the side wall of the tool bag;

wherein the rear surface of the pouch comprises a flap configured to fold over and magnetically engage the front surface of the pouch; and further wherein the second material is concealed within the top edge.

2. The modular tool bag pouch device of claim 1, wherein the first material is comprised of a water-resistant material.

3. A modular tool bag pouch device and tool bag system comprising:

a pouch comprising front and rear surfaces of a first material and a reinforced top edge of a second reinforcing metal material;

a first fastener;

a clip attachable to the rear surface of the pouch;

a tool bag having a side wall; and a belt with an outer surface, wherein a second fastener is located on the outer surface;

wherein the pouch adhesively attaches to the side wall of the tool bag via the first fastener; and further wherein the second reinforcing metal material is concealed within the top edge.

* * * * *